Patented Jan. 16, 1923.

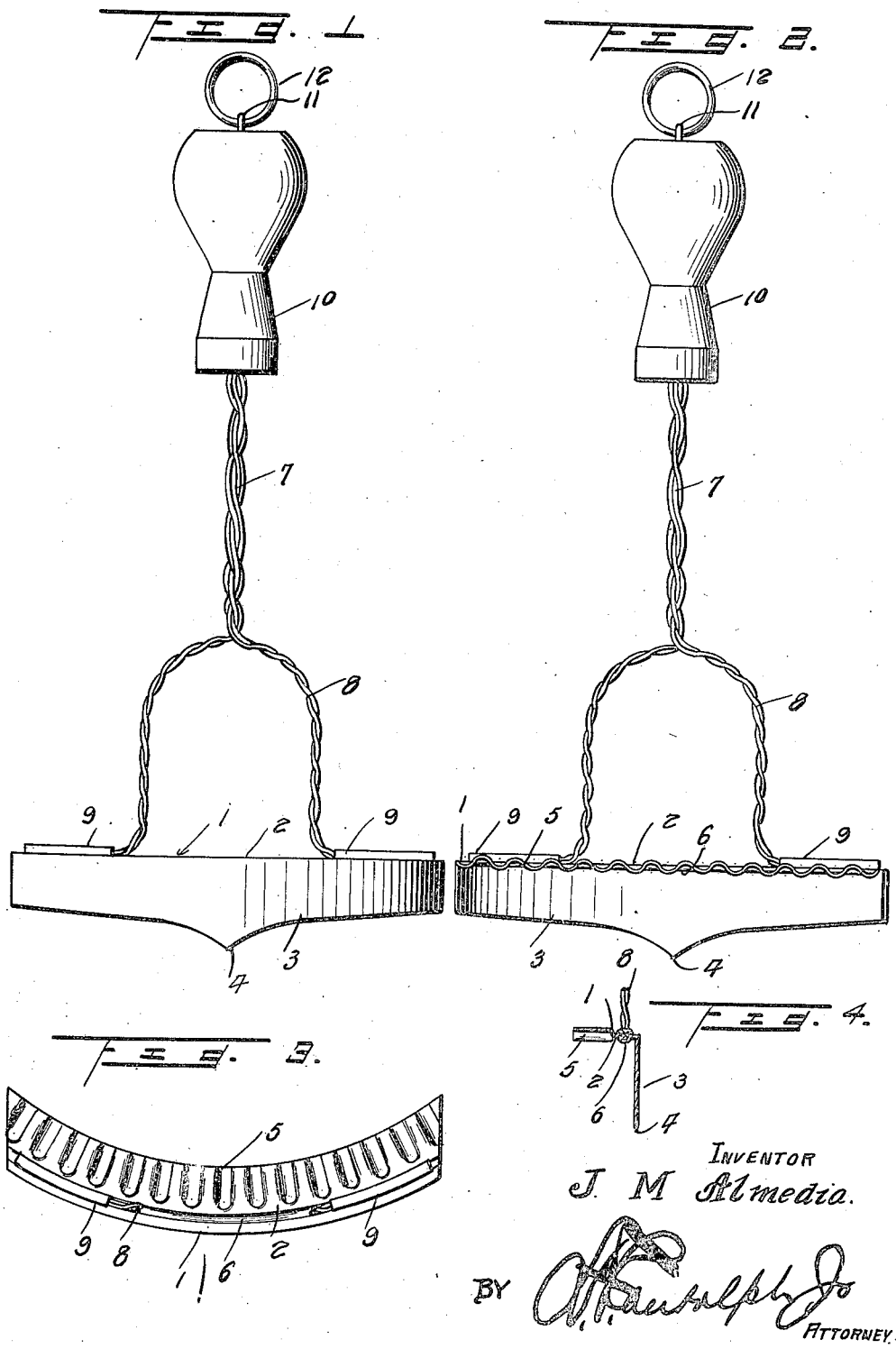

1,442,635

UNITED STATES PATENT OFFICE.

JOSE M. ALMEDIA, OF ROCK SPRINGS, WYOMING, ASSIGNOR OF ONE-HALF TO FRED W. JOHNSON, OF ROCK SPRINGS, WYOMING.

PIE CUTTER AND CRIMPER.

Application filed June 9, 1921. Serial No. 476,280.

*To all whom it may concern:*

Be it known that I, JOSE M. ALMEDIA, citizen of the United States, residing at Rock Springs, in the county of Sweetwater and State of Wyoming, have invented certain new and useful Improvements in Pie Cutters and Crimpers; and I do hereby declare the following to be a full, clear, and exact description of the invention, such as will enable others skilled in the art to which it appertains to make and use the same.

This invention relates to new and useful improvements in pastry tools and has for its primary object the provision of means for marking or crimping a pie and for severing the pie from the pan after the baking of the pie and thereby permit the easy removal of the pie from the pan without the danger of breaking the same.

Another object of this invention is the provision of a pie cutter and crimper of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation illustrating a pie cutter and crimper constructed in accordance with my invention, Figure 2 is a similar view illustrating the the opposite side of the cutter and crimper, Figure 3 is a longitudinal sectional view illustrating the crimping portion of the tool, Figure 4 is a transverse sectional view illustrating the device.

Referring in detail to the drawings the numeral 1 indicates a body having angularly related portions 2 and 3. The portions 2 and 3 are arranged at right angles to each other and the lower edge of the portion 3 is beveled to form a cutting edge 4 and said lower edge also inclines towards each end of the portion 3 from a point intermediate the ends of said portion 3 to provide oppositely inclined cutting edges to said portion 3. The portions 2 and 3 are arcuately curved to conform to the periphery of a pie and also the pan in which the pie is baked. The portion 2 has formed thereon a plurality of corrugations 5 adapted to form a crimping portion to the body 1. The corrugations 5 extend through one edge of the portion 2 while the portion 2 adjacent its formation onto the portion 3 is provided with an arcuate depression 6 adapted to form a groove or outer border on the crust of the pie while the grooves formed by the corrugations 5 on the crust or top of the pie extend radially from the first mentioned groove.

A shank 7 constructed from a plurality of twisted strands of wire is provided at one end with diverging arm portions 8 that have their free ends bent at right angles to form attaching portions 9 which are soldered or otherwise secured to the top face of the portion 2. The shank 7 is adapted to extend through a handle 10 and is provided with a loop or eye 11 at its end to receive a ring 12 which is adapted to prevent the handle from becoming disengaged from the shank 7 and also provides means whereby the device may be suspended from a hook or other support.

In operation when it is desired to crimp or mark a pie prior to baking of the latter, the portion 2 is brought into engagement with the edge of the pie so as to permit the groove 6 and corrugations 5 to form an impression in the dough of the pie. The portion 3 engages the edge of the pan containing the pie and thereby forms a guide for marking the pie with the portion 2. As the impression is made upon the dough or crust of the pie at one point the tool is lifted and again brought into contact with the pie and so continued until the marking is entirely around the outer edge of the pie.

After the baking of the pie, and it is desired to remove the same from the pan, the portion 3 is passed between the outer edge of the pie and the side wall of the pan so as to sever the pie from the pan and permit the pie to be easily removed.

While I have shown and described the preferred embodiment of my invention, it will be understood that minor changes in construction, combination, and arrangement of parts may be made without departing from the spirit and scope of the invention as claimed.

Having thus described my invention what I claim is:

1. A pie cutter and crimper comprising an arcuate shaped body having angularly related portions, one of said portions tapering downward from its extremities toward an intermediate point and having its edge sharpened to form a cutting edge, corrugations formed on the other portion to provide a crimper, and an upstanding shank provided with a handle and secured to said body.

2. A pie cutter and crimper comprising an arcuate shaped body having angularly related portions, one of said portions tapering downward from its extremities toward an intermediate point and having its edge sharpened to form a cutting edge, corrugations formed on the other portion to provide a crimper, a groove forming depression formed in said last named portion adjacent the point of connection of the crimper and cutter portions, and an outstanding shank having bearings in said groove and provided with a handle.

In testimony whereof I affix my signature in presence of two witnesses.

JOSE M. ALMEDIA.

Witnesses:
 JOHN MATAHA,
 S. FACINELLI.